(No Model.) 2 Sheets—Sheet 1.

B. T. SPELMAN.
GRAIN DRILL.

No. 605,524. Patented June 14, 1898.

Witnesses
J. C. Shaw
Chas. E. Brock

Inventor
Byron T. Spelman,
by O'Meara & Co.
Attorneys (No Model.)

B. T. SPELMAN.
GRAIN DRILL.

No. 605,524.  Patented June 14, 1898.

2 Sheets—Sheet 2.

Witnesses
J. C. Shaw
Chas. E. Brock

Inventor
Byron T. Spelman,
by O'Meara & Co.
Attorneys.

THE NORRIS PETERS CO., PHOTO-LITHO., WASHINGTON, D. C.

UNITED STATES PATENT OFFICE.

BYRON T. SPELMAN, OF JACKSONVILLE, ILLINOIS.

GRAIN-DRILL.

SPECIFICATION forming part of Letters Patent No. 605,524, dated June 14, 1898.

Application filed September 23, 1897. Serial No. 652,702. (No model.)

*To all whom it may concern:*

Be it known that I, BYRON T. SPELMAN, residing at Jacksonville, in the county of Morgan and State of Illinois, have invented a new and useful Grain-Drill, of which the following is a specification.

This invention relates generally to grain-drills, and more particularly to an improved construction of grain-drill whereby the grain is deposited in the furrow and then thoroughly covered, whereby the grain will germinate to the best advantage.

Another object is to provide a combination-plow or furrow-opener and delivery-tube which cannot be applied to any other kind of grain-drills now in use, and a still further object is to provide a feed-hopper which can be regulated to discharge the grain as desired.

Another object is to construct the drill in independently-movable sections, whereby the drill can be used for sowing the seed upon the side of a hill or on level ground.

With these various objects in view my invention consists in the peculiar construction of the various parts and in their novel combination or arrangement, all of which will be fully described hereinafter and pointed out in the claims.

Figure 1:
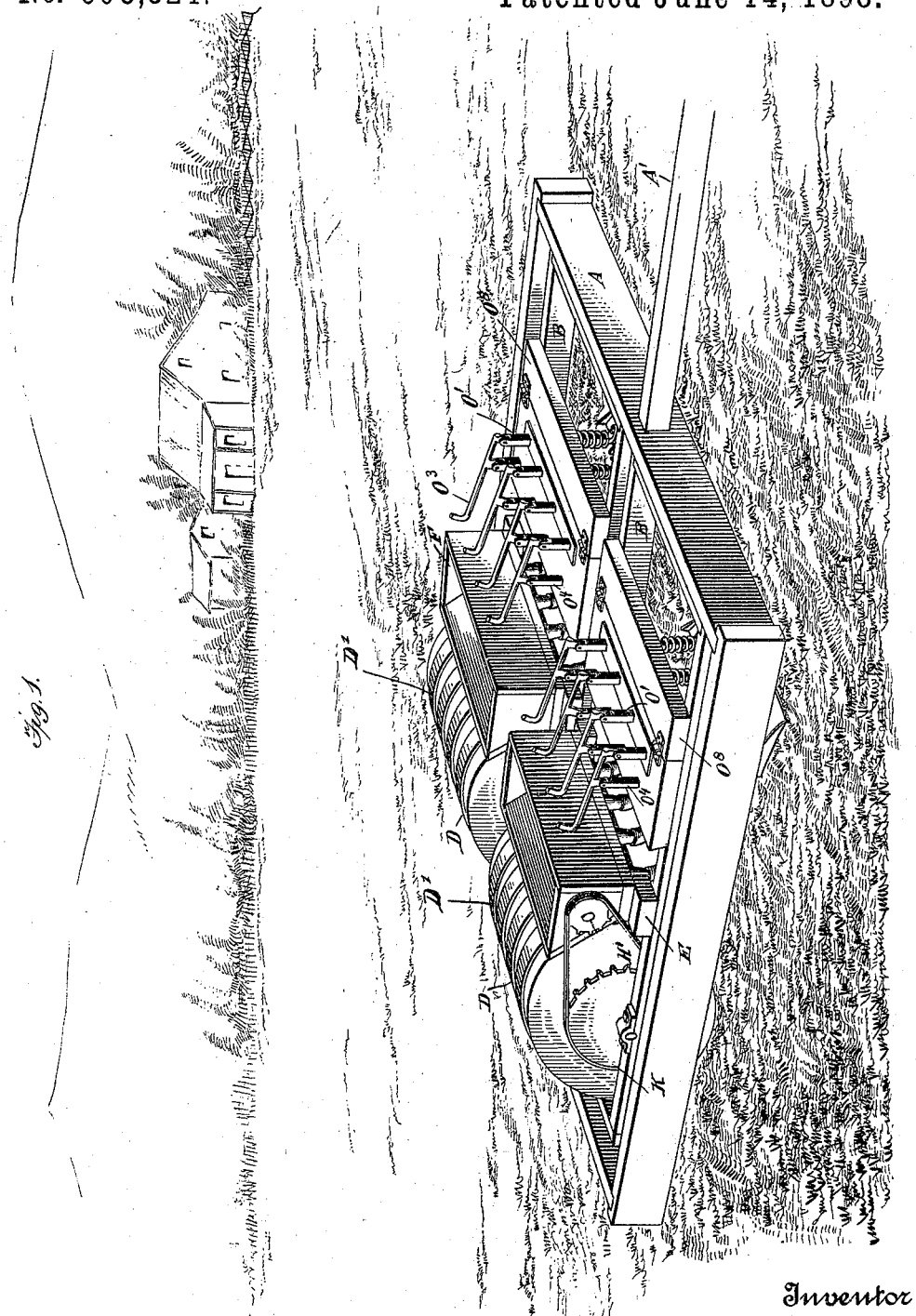
Figure 2:
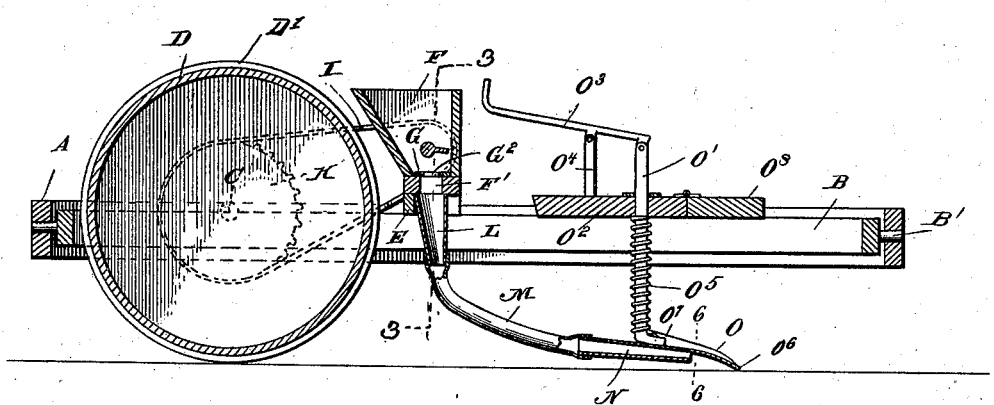
Figure 3:
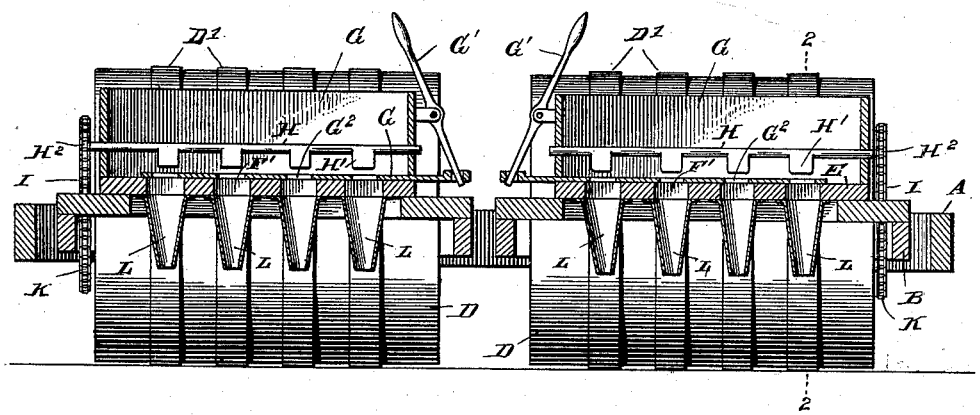
Figure 4:
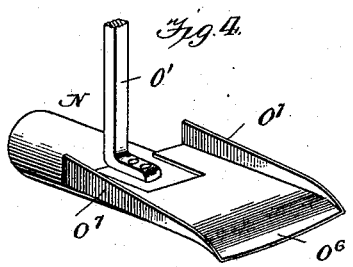
Figure 5:
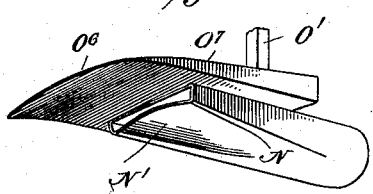
Figure 6:
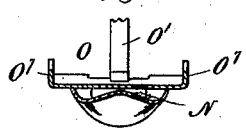

Referring to the drawings, Figure 1 is a perspective view of a grain-drill constructed in accordance with my invention. Fig. 2 is a vertical longitudinal section taken on the line 2 2 of Fig. 3. Fig. 3 is a transverse vertical section taken on the line 3 3 of Fig. 2. Fig. 4 is a detail perspective view of the combined plow or furrow-opener and delivery-tube. Fig. 5 is a bottom perspective view of the same part. Fig. 6 is a transverse sectional view taken on the line 6 6 of Fig. 2.

In carrying out my invention I employ a main frame A, essentially rectangular in shape and longer from side to side than from front to back, said main frame being provided with a suitable draft-pole A'.

Within the main frame A is arranged a series (two in the present instance) of rectangular-shaped frames B, centrally pivoted between the front and rear sides of the main frame by means of the pivot-bolts B'. An axle C is journaled near the rear end of each frame B, and mounted upon each axle is a supporting and operating drum D, provided with the annular bands D', which serve the purpose of pressing-bands for covering up the grain deposited in the furrow. In the drawings I have shown four such bands applied to each drum, but it will of course be understood that any desired number may be employed.

A cross-beam E is arranged upon each frame B, and mounted upon this cross-beam is the hopper F, the bottom of which has a series of openings F', four in number, and upon the bottom of each hopper is arranged a sliding cut-off valve G, operating by means of a handle-lever G', arranged upon the end of the hopper, said sliding cut-off valve having openings $G^2$, adapted to register with the openings F' and permit the grain to pass from the hopper, as most clearly shown.

In order to prevent the grain clogging within the hopper, I employ a rotary agitator-shaft H, having the agitating-arms H' arranged thereon, and at the outer end of said shaft is arranged the sprocket-wheel $H^2$, around which passes the sprocket-chain I, said sprocket-chain being driven by means of a larger sprocket K, mounted upon the outer end of each drum, as shown in Figs. 1, 2, and 3. It will thus be seen that as the machine is drawn along over the field the grain within the hopper is thoroughly agitated, and by regulating the sliding cut-off valve any desired quantity of grain can be dropped through the openings F' into the discharge-tubes L, said discharge-tubes in turn leading into the flexible connecting-tubes M, which connect the delivery-tube N with the hopper, said delivery-tube N being arranged upon the bottom of the plow or furrow-opener O, which plow or furrow-opener is carried upon the lower end of the standard O', which passes upward through a hinge-board $O^2$ and is connected at its upper end by means of a lever $O^3$, mounted upon the bracket $O^4$, and surrounding the standard between the plow O and hinge-board $O^2$ is a coiled spring $O^5$, the purpose of which is to normally hold the plow or furrow-opener in its proper operative position. The board $O^2$ is hinged to a cross-beam $O^3$, as most clearly shown in Figs. 1 and 2.

The forward end of the furrow-opener or plow is bent outwardly, as shown at $O^6$, so that it will engage the earth at a point lower than the bottom of the delivery-tube N, so that the earth will pass upward over the plow or furrow-opener and will be guided by the side flanges $O^7$ back to the rear end of the delivery-tube N and will there fall over the grain deposited in the furrow beneath the plow or opener, as most clearly shown in Fig. 2.

The bottom of the delivery-tube is preferably bent inwardly, as shown at N', in order to distribute the grain evenly at each end or side.

By means of the lever $O^3$ any one or all of the plows can be raised whenever desired, and, if necessary, the board $O^2$ can be tilted forwardly, thereby lifting the plow or furrow-opener away from the ground, such adjustment being found convenient when moving the grain-drill from one place to another.

From the above description, taken in connection with the accompanying drawings, the operation and advantages of my improved construction of grain-drill will be apparent to every one skilled in the use of agricultural implements.

By having the grain-drill constructed in independent sections the drill can be used for sowing grain upon the hillside and each hopper will be held in the proper positions and the agitator shaft and arms operated to properly distribute the seed. Furthermore, the connection between the hopper and dropper is such that the grain will be quickly and easily fed to the dropper, and the peculiar construction of this dropper, comprising, as it does, a plow or furrow-opener and delivery-tube arranged beneath the same, insures the depositing of the grain properly within the furrow and prior to the fall of earth thereon. The earth falls quickly upon the grain after passing over the plow or furrow-opener, and as the drums are provided with covering-bands which are arranged directly in line with the furrow the rolls will be rolled down in the proper manner, thereby insuring the sowing of the seed in a thorough and novel manner.

Having thus described my invention, what I claim as new, and desire to secure by Letters Patent, is—

1. In a grain-drill, the combination with the main frame, of the independently-pivoted supporting-frames arranged within the main frame and the hopper, the dropper and the operating mechanism arranged within each pivoted frame, substantially as shown and described.

2. In a grain-drill, the combination with the main frame of the independently-pivoted frames arranged within the main frame, the grain-hopper arranged upon each frame, the drum provided with covering-bands, the operating-sprockets and chain and the dropper arranged also in each frame, said dropper being connected to the hopper, substantially as shown and described.

3. In a grain-drill, the combination with the main frame of the independent frames pivoted within the main frame, the hopper and drum arranged in each frame, the discharge and connecting tubes, the delivery-tube and the plows or furrow-openers to which the delivery-tubes are attached, substantially as shown and described.

4. In a grain-drill, the combination with the standard of the plow or furrow-opener arranged upon the lower end of said standard and the delivery-tube arranged beneath the said plow or furrow-opener the forward end of said plow being bent downwardly at a point below the forward end of the delivery-tube, substantially as shown and described.

5. In a grain-drill, the combination with the standard of the plow or furrow-opener having the side flanges and the forward end bent downwardly and the delivery-tube arranged upon the under side of the said plow, the bottom of said delivery-tube being pressed inwardly at the forward end, substantially as shown and described.

6. In a grain-drill, the combination with the main frame of the independent frames pivoted within the main frame, the hopper arranged upon each frame, the drum provided with covering-bands, the sprockets and drive-chain, the agitating-shaft having arms sliding cut-off valve, the discharge and connecting tubes, the delivery-tube and furrow-opener, the standard to which the said furrow-opener is attached the cross-beam $O^8$, and the hinge-board $O^2$ through which the standard passes, the hand-lever for raising said standard and the coiled spring surrounding the standard below the hinge-board $O^2$ all arranged and adapted to operate substantially as shown and described.

BYRON T. SPELMAN.

Witnesses:
ROBERT TILTON,
MICHAEL WOERNER.